(12) United States Patent
Lee

(10) Patent No.: US 11,936,057 B2
(45) Date of Patent: Mar. 19, 2024

(54) BATTERY MODULE WITH NANO COMPOSITE COATING

(71) Applicant: Nano Shield Technology Co., Ltd., Taipei (TW)

(72) Inventor: James Cheng Lee, La Habra, CA (US)

(73) Assignee: Nano Shield Technology Co., Ltd., Taipei (TW)

( * ) Notice: Subject to any disclaimer, the term of this patent is extended or adjusted under 35 U.S.C. 154(b) by 372 days.

(21) Appl. No.: 17/010,894

(22) Filed: Sep. 3, 2020

(65) Prior Publication Data

US 2021/0408513 A1 Dec. 30, 2021

Related U.S. Application Data

(60) Provisional application No. 63/045,960, filed on Jun. 30, 2020.

(51) Int. Cl.
*H01M 50/24* (2021.01)
*C09D 167/00* (2006.01)
(Continued)

(52) U.S. Cl.
CPC .......... *H01M 50/24* (2021.01); *C09D 167/00* (2013.01); *C09D 175/04* (2013.01); *H01M 50/20* (2021.01);
(Continued)

(58) Field of Classification Search
CPC .... H01M 50/24; H01M 50/20; H01M 50/213; H01M 50/284; H01M 50/502; H01M 10/4207; H01M 10/425; Y02E 60/10
See application file for complete search history.

(56) References Cited

U.S. PATENT DOCUMENTS

| 5,858,551 A * | 1/1999 | Salsman ................ D21H 19/62 |
| | | 525/437 |
| 2007/0152235 A1* | 7/2007 | Hosoya ............... H01M 50/548 |
| | | 257/111 |

(Continued)

FOREIGN PATENT DOCUMENTS

| CN | 104733680 A | 6/2015 |
| CN | 106010188 A | * 10/2016 |

(Continued)

OTHER PUBLICATIONS

Nayfeh et al., Uniform delivery of silicon nanoparticles on device quality substrates using spin coating from isopropyl alcohol colloids. Applied Physics Letters 94, 043112 (2009). (Year: 2009).*

(Continued)

*Primary Examiner* — Milton I Cano
*Assistant Examiner* — Joshua P Mcclure
(74) *Attorney, Agent, or Firm* — Lin & Associates Intellectual Property, Inc.

(57) ABSTRACT

A battery module with nano-composite coating includes at least one battery pack which includes a plurality of batteries and at least two busbars, and at least one circuit board. Each battery are connected with two electrodes. The metal barrel body of each battery is coated with a first nano coating. The plurality of the batteries are connected to the two busbars by a plurality of wires, each busbar and the electrodes of the plurality of the batteries exposed outside are coated with a second nano coating. The at least one circuit board is connected to each busbar. The at least one circuit board is coated with a third nano coating. The plurality of the wires are used for being soldered with each battery, each busbar and the at least one circuit board of which soldering positions are coated with a fourth nano coating.

20 Claims, 5 Drawing Sheets

(51) Int. Cl.
*C09D 175/04* (2006.01)
*H01M 50/20* (2021.01)
*H01M 50/213* (2021.01)
*H01M 50/284* (2021.01)
*H01M 50/502* (2021.01)

(52) U.S. Cl.
CPC ....... *H01M 50/213* (2021.01); *H01M 50/284* (2021.01); *H01M 50/502* (2021.01)

(56) References Cited

U.S. PATENT DOCUMENTS

| | | | | |
|---|---|---|---|---|
| 2012/0034507 | A1* | 2/2012 | Harada | H01M 10/625 429/120 |
| 2013/0164567 | A1* | 6/2013 | Olsson | H01M 50/224 429/93 |
| 2014/0017521 | A1* | 1/2014 | Suzuki | H01M 10/4257 429/7 |
| 2017/0367194 | A1* | 12/2017 | Lee | H05K 3/285 |
| 2019/0207179 | A1* | 7/2019 | Sugiyama | H01M 10/653 |
| 2019/0372071 | A1 | 12/2019 | An | |

FOREIGN PATENT DOCUMENTS

| | | | | |
|---|---|---|---|---|
| CN | 108300200 | A * | 7/2018 | .......... C09D 167/06 |
| CN | 111293266 | A | 6/2020 | |
| TW | 201915116 | A | 4/2019 | |

OTHER PUBLICATIONS

Qiu et al. (CN 108300200 A and Machine Translation Version) (Year: 2018).*

Wei et al. (CN-106010188-A and Machine Translation Version) (Year: 2016).*

EP 20196745.2, European Search Report, dated Feb. 8, 2021.

* cited by examiner

BATTERY MODULE WITH NANO COMPOSITE COATING

CROSS-REFERENCE TO RELATED APPLICATION

This application claims the priorities of U.S. provisional patent application No. 63/045,960, filed on Jun. 30, 2020, which is incorporated herewith by reference.

BACKGROUND OF THE INVENTION

1. Field of the Invention

The present invention generally relates to a battery module, and more particularly to a battery module with nano composite coating.

2. The Related Art

Generally, an outside of a conventional battery module is covered with an external waterproof structure to prevent water from permeating into the conventional battery module. However, when a waterproof function of the external waterproof structure is invalid due to a damage of the external waterproof structure, the water can permeate into the conventional battery module to cause shortages of internal batteries and a circuit board of the conventional battery module, so the conventional battery module is damaged, and the conventional battery module even causes a fire risk or an explosion risk.

Therefore, it is necessary to provide an innovative battery module with nano composite coating, the innovative battery module with nano composite coating includes a plurality of internal components, and a nano composite coating coated on surfaces of the plurality of the internal components, the innovative battery module with nano composite coating can make the surfaces of the plurality of the internal components have an insulation function and a waterproof function for improving a safety of the innovative battery module with nano composite coating and prolonging a usage life of the innovative battery module with nano composite coating in bad environments.

SUMMARY OF THE INVENTION

An object of the present invention is to provide a battery module with nano-composite coating. The battery module with nano-composite coating includes at least one battery pack and at least one circuit board. The at least one battery pack includes a plurality of batteries and at least two busbars. Each battery has a metal barrel body. Two opposite ends of the metal barrel body of each battery are connected with two electrodes. An outer surface of the metal barrel body of each barrel-shaped battery is coated with a first nano coating. The first nano coating is composed of a first macromolecule waterproof coating. Two busbars are respectively mounted to the two electrodes of each battery, and the plurality of the batteries are connected to the two busbars by a plurality of wires, so the plurality of the batteries are connected in series, each busbar and the electrodes of the plurality of the batteries connected to each busbar and exposed outside are coated with a second nano coating. The at least one circuit board is connected to each busbar by a plurality of wires. The at least one circuit board is coated with a third nano coating. The third nano coating is formed by successively coating a first solution, the first macromolecule waterproof coating, a second macromolecule waterproof coating, a third macromolecule waterproof coating and a second solution on the at least one circuit board. The plurality of the wires are used for being soldered with each battery, each busbar and the at least one circuit board, so the at least one battery pack is connected with the at least one circuit board, soldering positions among each wire, each battery, each busbar and the at least one circuit board are coated with a fourth nano coating, the fourth nano coating is formed by coating the third macromolecule waterproof coating and the first macromolecule waterproof coating on the soldering positions among each wire, each battery, each busbar and the at least one circuit board successively.

An object of the present invention is to provide a battery module with nano-composite coating. The battery module with nano-composite coating includes a plurality of the battery packs, a plurality of busbars, a plurality of wires and at least one circuit board. Each battery pack includes a plurality of batteries. Each battery has a metal barrel body. Two opposite ends of the metal barrel body of each battery are connected with two electrodes. An outer surface of the metal barrel body of each barrel-shaped battery is coated with a first nano coating. The first nano coating is composed of a first macromolecule waterproof coating. Two busbars are respectively mounted to the two electrodes of each battery. The plurality of the wires are connected among the plurality of the busbars. The plurality of the battery packs are connected in parallel. The plurality of the busbars and the electrodes of the plurality of the batteries connected to the plurality of the busbars and exposed outside are coated with a second nano coating. The second nano coating is formed by successively coating a second macromolecule waterproof coating and the first macromolecule waterproof coating on surfaces of each busbar and the electrodes of the plurality of the batteries connected to each busbar and exposed outside. The at least one circuit board is connected to each busbar by the plurality of the wires. The at least one circuit board is coated with a third nano coating. The third nano coating is formed by successively coating a first solution, the first macromolecule waterproof coating, the second macromolecule waterproof coating, a third macromolecule waterproof coating and a second solution on the at least one circuit board. The plurality of the wires are used for being soldered with each battery, each busbar and the at least one circuit board, so each battery pack is connected with the at least one circuit board, soldering positions among each wire, each battery, each busbar and the at least one circuit board are coated with a fourth nano coating, the fourth nano coating is formed by coating the third macromolecule waterproof coating and the first macromolecule waterproof coating on the soldering positions among each wire, each battery, each busbar and the at least one circuit board successively.

An object of the present invention is to provide a battery module with nano-composite coating. The battery module with nano-composite coating includes a plurality of the battery packs, a plurality of busbars mounted to the electrodes of the plurality of the batteries, a plurality of wires and at least one circuit board. Each battery pack includes a plurality of batteries. Each battery has a metal barrel body. Two opposite ends of the metal barrel body of each battery are connected with two electrodes. An outer surface of the metal barrel body of each barrel-shaped battery is coated with a first nano coating composed of a first macromolecule waterproof coating. The plurality of wires connected among the plurality of the busbars, the plurality of the battery packs are connected in parallel. The plurality of the busbars and the electrodes of the plurality of the batteries connected to the plurality of the busbars and exposed outside are coated with a second nano coating. The second nano coating is formed by successively coating a second macromolecule waterproof coating and the first macromolecule waterproof coating on surfaces of each busbar and the electrodes of the plurality of the batteries connected to each busbar and exposed outside. The at least one circuit board is connected to each busbar by the plurality of the wires. The at least one circuit board is coated with a third nano coating. The third nano coating is formed by successively coating a first solution, the first macromolecule waterproof coating, the second macromolecule waterproof coating, a third macromolecule waterproof coating and a second solution on the at least one circuit board. The plurality of the wires are soldered with each battery, each busbar and the at least one circuit board, so each battery pack is connected with the at least one circuit board. Soldering positions among each wire, each battery, each busbar and the at least one circuit board are coated with a fourth nano coating which is formed by coating the third macromolecule waterproof coating and the first macromolecule waterproof coating on the soldering positions among each wire, each battery, each busbar and the at least one circuit board successively. The third macromolecule waterproof coating is ahead coated on tips, corners or other thinner portions of components of the at least one circuit board by a point-coating way.

As described above, the battery module with nano-composite coating has an insulation effect, a waterproof effect and a corrosion resistance effect by virtue of coating nano-composite coatings to the at least one battery pack, the at least one circuit board and the plurality of the wires and the soldering positions among the at least one battery pack, the at least one circuit board and the plurality of the wires.

BRIEF DESCRIPTION OF THE DRAWINGS

The present invention will be apparent to those skilled in the art by reading the following description, with reference to the attached drawings, in which.

DETAILED DESCRIPTION OF THE PREFERRED EMBODIMENT

Figure 1:
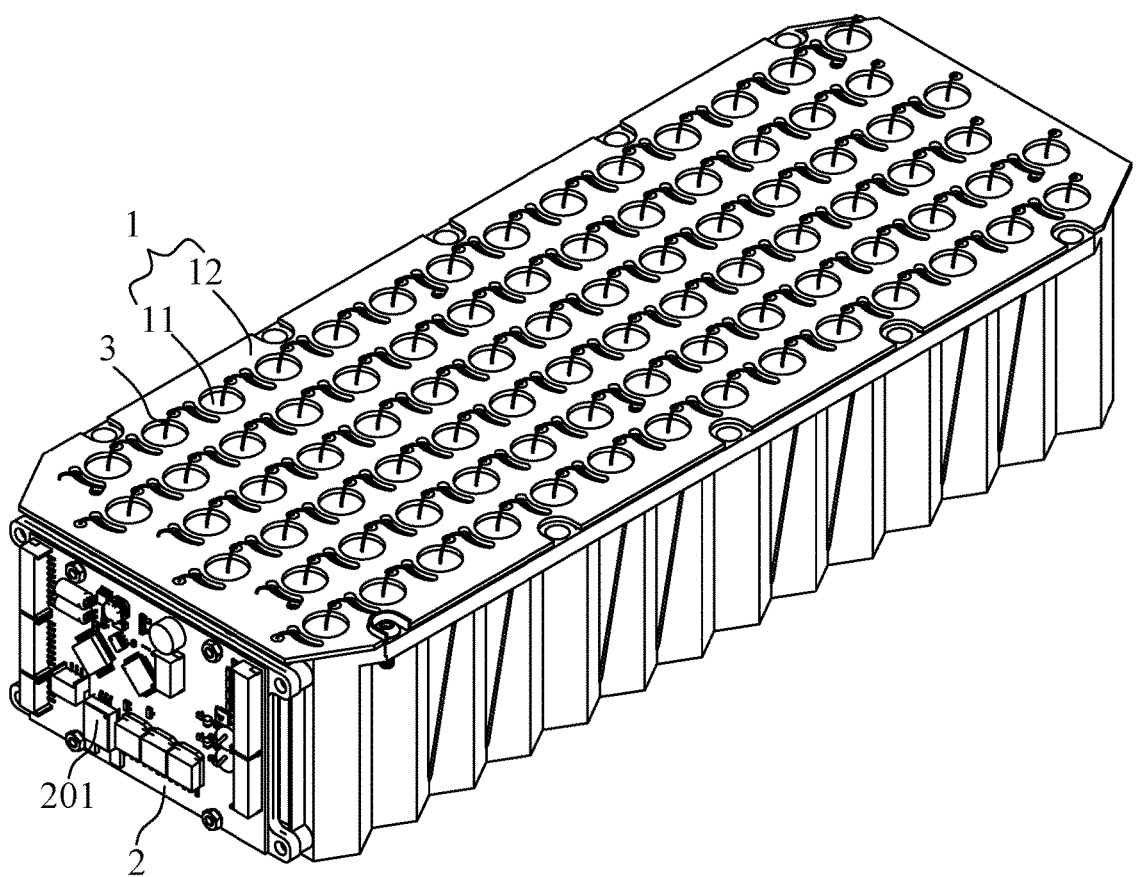
FIG. 1 is a perspective view of a battery module with nano-composite coating in accordance with the present invention.

With reference to FIG. 1, a battery module with nano-composite coating 100 in accordance with the present invention is shown. The battery module with nano-composite coating 100 includes at least one battery pack 1, at least one circuit board 2 and a plurality of wires 3.

Figure 2:
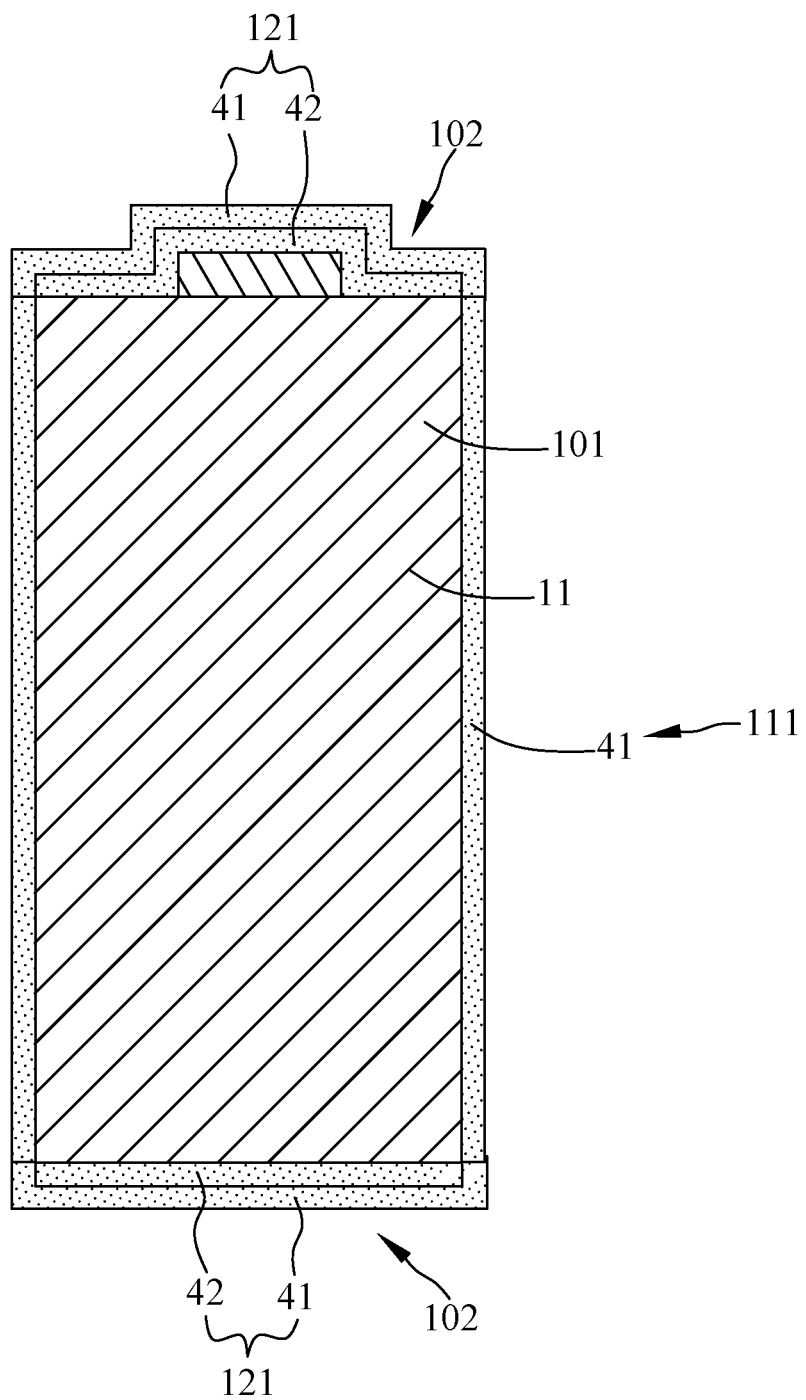
FIG. 2 is a schematic diagram of a battery of the battery module with nano-composite coating, wherein the battery is coated with a coating.

With reference to FIG. 1 and FIG. 2, the at least one battery pack 1 includes a plurality of batteries 11 and at least two busbars 12. Each battery 11 is shown as a barrel shape. Each battery 11 has a metal barrel body 101. Two opposite ends of the metal barrel body 101 of each battery 11 are connected with two electrodes 102 which are a positive electrode and a negative electrode. An outer surface of the metal barrel body 101 of each barrel-shaped battery 11 is coated with a first nano coating 111. The first nano coating 111 is composed of a first macromolecule waterproof coating 41, and the first macromolecule waterproof coating 41 is composed of a mixture of a polyurethane (PU) resin, an alkyd resin, a diluent and titanium dioxide (TiO2). The first macromolecule waterproof coating 41 has an insulation characteristic, a waterproof characteristic and a corrosion resistance characteristic. When the plurality of the batteries 11 are arranged, the insulation characteristic is able to prevent the metal barrel bodies 101 of the plurality of the batteries 11 from being in contact with one another to make the plurality of the batteries 11 cause broken circuits, thereby damaging the battery pack 1.

Specifically, a content of the polyurethane resin in the first macromolecule waterproof coating 41 is ranged from about 18.3 wt % to about 28.3 wt %. A content of the alkyd resin in the first macromolecule waterproof coating 41 is ranged from about 57.2 wt % about 67.2 wt %. A content of the diluent in the first macromolecule waterproof coating 41 is ranged from about 9.2 wt % to about 19.2 wt %. A particle size of the titanium dioxide in the first macromolecule waterproof coating 41 is ranged from 5 nm to 100 nm, and a content of the titanium dioxide in the first macromolecule waterproof coating 41 is ranged from about 1.3 wt % to about 2.3 wt %. Nm is short for nanometer, and wt is short for weight.

With reference to FIG. 1 to FIG. 4, two busbars 12 are respectively mounted to the two electrodes 102 of each battery 11, and the plurality of the batteries 11 are connected to the two busbars 12 by the plurality of the wires 3, so the plurality of the batteries 11 are connected in series. Each busbar 12 and the electrodes of the plurality of the batteries 11 connected to each busbar 12 which are exposed outside are coated with a second nano coating 121. The second nano coating 121 is formed by successively coating a second macromolecule waterproof coating 42 and the first macromolecule waterproof coating 41 on surfaces of each busbar 12 and the electrodes of the plurality of the batteries 11 connected to each busbar 12 and exposed outside.

When the battery module with nano-composite coating 100 further includes a plurality of the battery packs 1, and a plurality of busbars 12 mounted to the electrodes 102 of the plurality of the batteries 11, the plurality of the wires 3 are connected among the plurality of the busbars 12, so the plurality of the battery packs 1 are connected in parallel. Each battery pack 1 includes the plurality of the batteries 11. The plurality of the busbars 12 and the electrodes 102 of the plurality of the batteries 11 connected to the plurality of the busbars 12 and exposed outside are coated with the second nano coating 121. The second nano coating 121 is formed by successively coating the second macromolecule waterproof coating 42 and the first macromolecule waterproof coating 41 on the surfaces of each busbar 12 and the electrodes 102 of the plurality of the batteries 11 connected to each busbar 12 and exposed outside.

The second macromolecule waterproof coating 42 is composed of the mixture of the polyurethane (PU) resin, the diluent and the titanium dioxide (TiO2). The second macromolecule waterproof coating 42 has the insulation characteristic, the waterproof characteristic and the corrosion resistance characteristic. The second nano coating 121 makes the surfaces of the plurality of the busbars 12 and the electrodes 102 of the plurality of the batteries 11 connected to the plurality of the busbars 12 and exposed outside have an insulation effect, a waterproof effect and a corrosion resistance effect. Specifically, the second nano coating 121 makes outer surfaces of the plurality of the busbars 12 and the electrodes 102 of the plurality of the batteries 11 connected to the plurality of the busbars 12 and exposed outside have the insulation effect, the waterproof effect and the corrosion resistance effect.

Specifically, a content of the polyurethane resin in the second macromolecule waterproof coating 42 is ranged from about 73.5 wt % to about 83.5 wt %. A content of the diluent in the second macromolecule waterproof coating 42 is ranged from about 14.5 wt % to about 25.5 wt %. A particle size of the titanium dioxide in the second macromolecule waterproof coating 42 is ranged from 5 nm to 100 nm, and a content of the titanium dioxide in the second macromolecule waterproof coating 42 is ranged from about 1.0 wt % to about 2.0 wt %. As described above, the second nano coating 121 is formed by successively coating the second macromolecule waterproof coating 42 and the first macromolecule waterproof coating 41. It should be noted that the first macromolecule waterproof coating 41 and the second macromolecule waterproof coating 42 have different compositions.

When the at least one battery pack 1 is immersed in water, the first nano coating 111 coated on the outer surface of the metal barrel body 101 of each barrel-shaped battery 11 and the second nano coating 121 coated on the outer surfaces of the plurality of the busbars 12 and the electrodes 102 of the plurality of the batteries 11 connected to the plurality of the busbars 12 and exposed outside both have waterproof effects, so the at least one battery pack 1 is used normally in water. The first nano coating 111 and the second nano coating 121 also have corrosion resistance effects. If one battery 11 in the at least one battery pack 1 is damaged, a corrosive battery liquid will leak out from the one damaged battery 11 and is adhered to the batteries 11 of the at least one battery pack 1 around the one battery 11. At the moment, corrosion resistance characteristics of the first nano coating 111 and the second nano coating 121 make the batteries 11 of the at least one battery pack 1 around the one damaged battery 11 hardly be corroded by the corrosive battery liquid, so that the batteries 11 of the at least one battery pack 1 around the one damaged battery 11 are protected to be corroded hardly to further prevent more batteries 11 of the at least one battery pack 1 being damaged.

In further, the characteristics of the first macromolecule waterproof coating 41 and the second macromolecule waterproof coating 42 are substantially equivalent. A flowability of the first macromolecule waterproof coating 41 is larger than a flowability of the second macromolecule waterproof coating 42. A viscosity of the second macromolecule waterproof coating 42 is larger than a viscosity of the first macromolecule waterproof coating 41. When the second nano coating 121 is coated, the second macromolecule waterproof coating 42 is coated on the outer surface of the metal barrel body 101 of each barrel-shaped battery 11 in advance to make the second macromolecule waterproof coating 42 attached on the outer surface of the metal barrel body 101 of each barrel-shaped battery 11.

Because of a material characteristic of the second macromolecule waterproof coating 42, an edge or a surface of the coated second macromolecule waterproof coating 42 will have a plurality of tiny apertures, cracks and other structures, and then, the first macromolecule waterproof coating 41 is coated on the second macromolecule waterproof coating 42. The first macromolecule waterproof coating 41 has a better flowability, and the first macromolecule waterproof coating 41 and the second macromolecule waterproof coating 42 are interpenetrated with each other, and the first macromolecule waterproof coating 41 and the second macromolecule waterproof coating 42 will be probably without forming two isolation layers, so that the second nano coating 121 is capable of completely being adhered to and surrounding coated regions of the plurality of the busbars 12 and the electrodes 102 of the plurality of the batteries 11 connected to the plurality of the busbars 12 and exposed outside.

Figure 3:
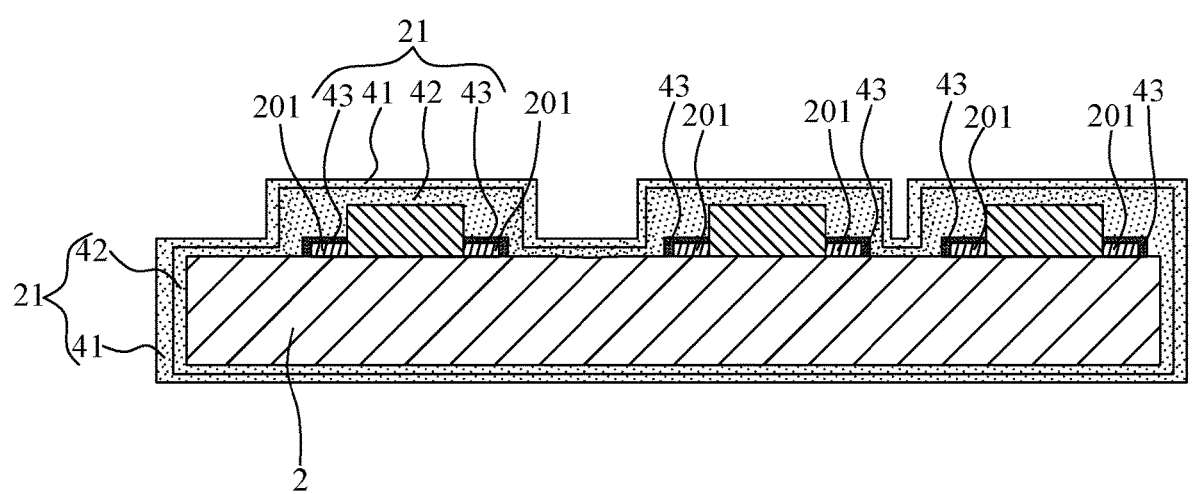
FIG. 3 is a schematic diagram of a circuit board of the battery module with nano-composite coating, wherein the circuit board is coated with a coating.
Figure 4:
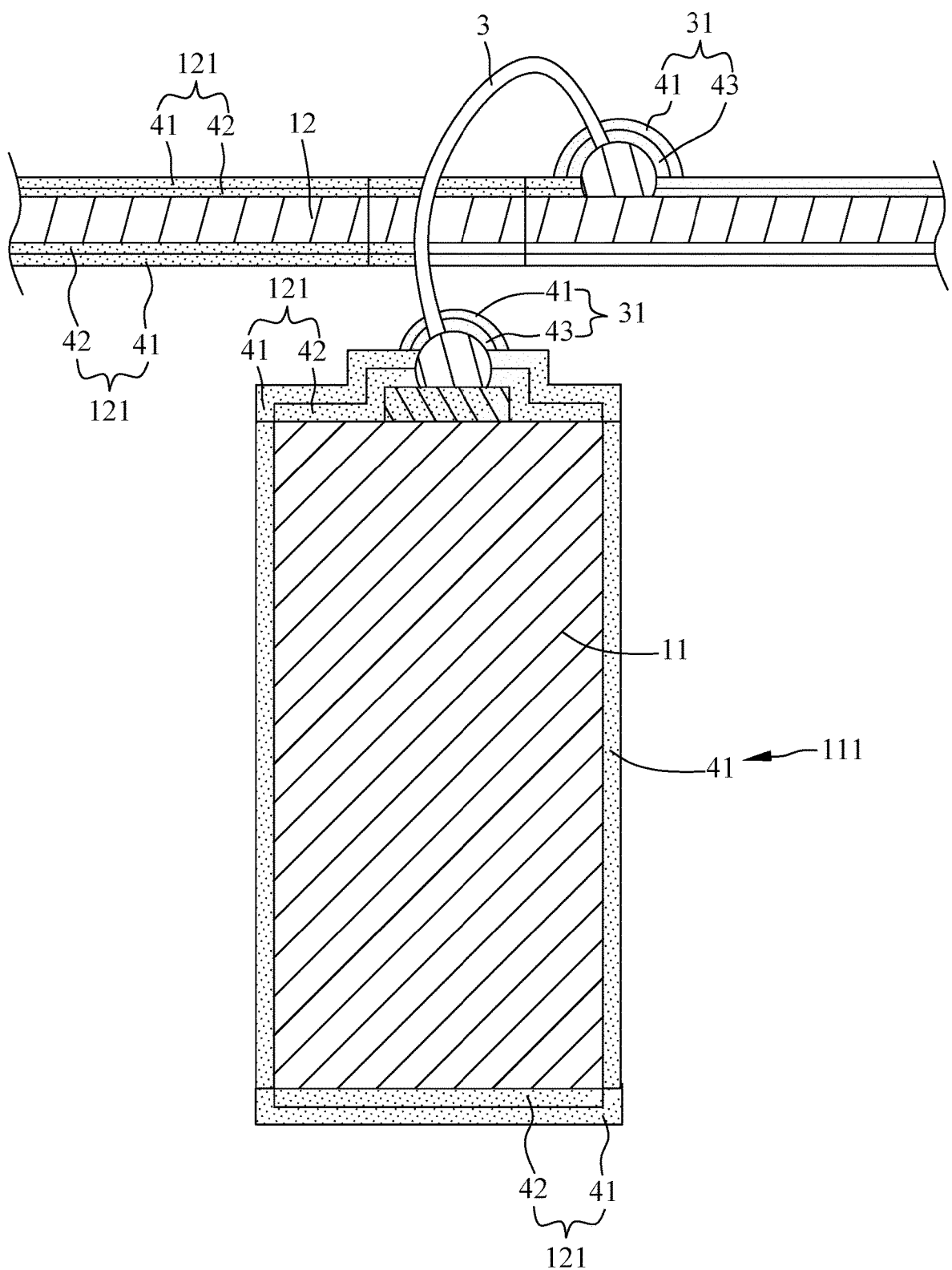
FIG. 4 is a schematic diagram showing that a wire is soldered to the battery and a busbar of the battery module with nano-composite coating coated with coatings.
Figure 5:
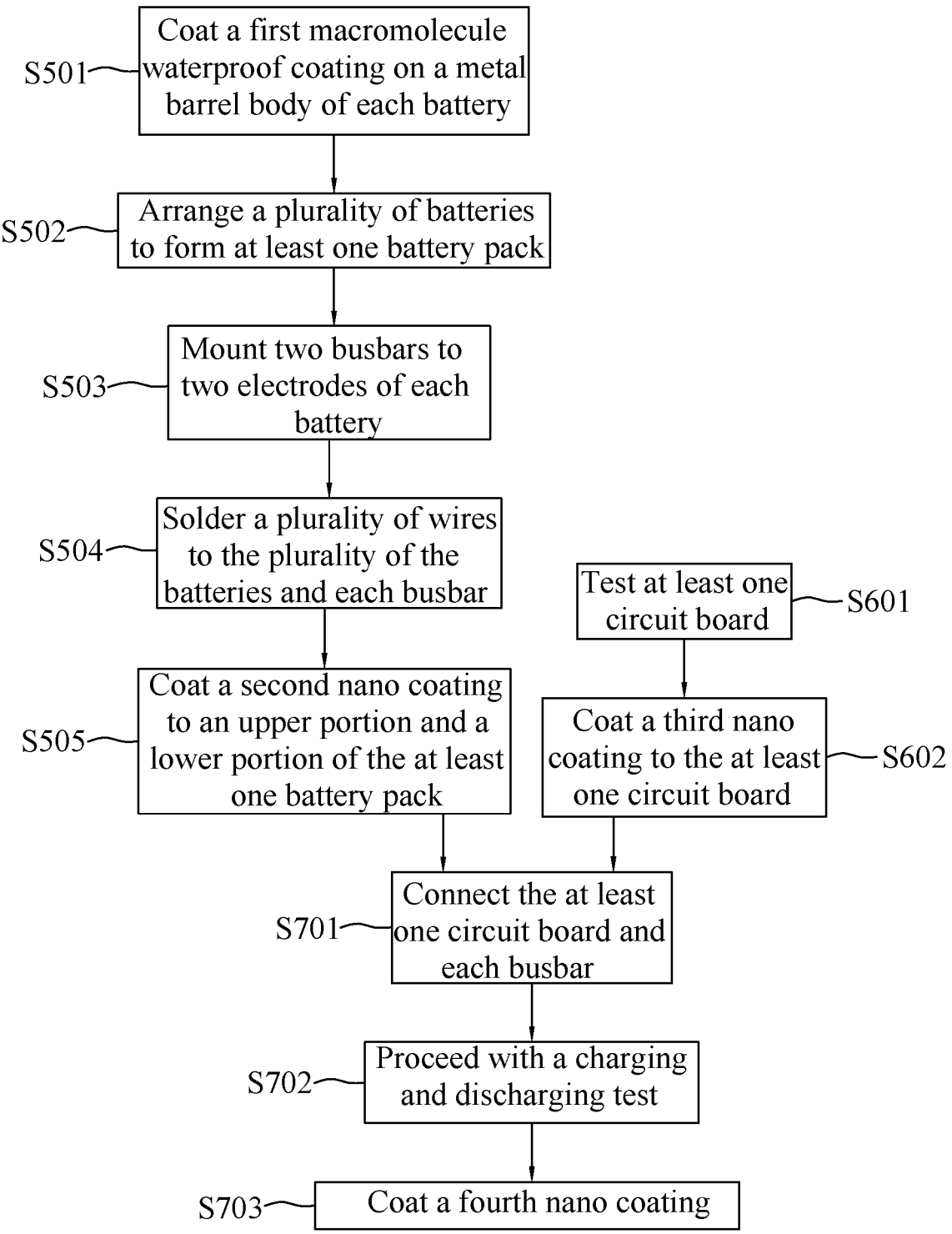
FIG. 5 is a flow chart of a manufacturing method of the battery module with nano-composite coating.

With reference to FIG. 1 to FIG. 3, the at least one circuit board 2 is connected to each busbar 12 by the plurality of the wires 3. The at least one circuit board 2 is coated with a third nano coating 21. The third nano coating 21 is formed by successively coating a first solution, a third macromolecule waterproof coating 43, the second macromolecule waterproof coating 42, the first macromolecule waterproof coating 41 and a second solution on the at least one circuit board 2.

The first solution includes a plurality of metal oxide nanoparticles, and a particle size of each metal oxide nanoparticle is ranged from 5 nm to 100 nm. The second solution includes a plurality of silicon dioxide (SiO2) nanoparticles, and a particle size of each silicon dioxide (SiO2) nanoparticle is ranged from 0.1 nm to 10 nm. It is worth mentioning that the first solution and the second solution have different compositions.

The plurality of the metal oxide nanoparticles in the first solution are dispersed in pure water, and a content of the plurality of the metal oxide nanoparticles in the first solution is ranged from about 0.4 wt % to about 0.8 wt %. The plurality of the silicon dioxide (SiO2) nanoparticles in the second solution are dispersed in isopropanol of which a content in an isopropanol solution is ranged from about 98.5 wt % to 99.5 wt %, and a content of the plurality of the silicon dioxide (SiO2) nanoparticles in the second solution is ranged from about 0.5 wt % to about 1.5 wt %.

Because contacting areas of tips, corners or other thinner portions of components 201 of the at least one circuit board 2 are smaller, the first macromolecule waterproof coating 41 and the second macromolecule waterproof coating 42 are difficult to be adhered on the tips, the corners or other thinner portions of the components 201 of the at least one circuit board 2, at the moment, the third macromolecule waterproof coating 43 is ahead coated on the tips, the corners or other thinner portions of the components 201 of the at least one circuit board 2 by a point-coating way.

The third macromolecule waterproof coating 43 is composed of a mixture of the polyurethane resin and the plurality of the silicon dioxide nanoparticles. Compare the third macromolecule waterproof coating 43 with the first macromolecule waterproof coating 41 and the second macromolecule waterproof coating 42, the third macromolecule waterproof coating 43 has an insulation characteristic, a waterproof characteristic and a corrosion resistance characteristic which are the same as the insulation characteristics, the waterproof characteristics and the corrosion resistance characteristics of the first macromolecule waterproof coating 41 and the second macromolecule waterproof coating 42. A viscosity of the third macromolecule waterproof coating 43 is stronger than the viscosity of the second macromolecule waterproof coating 42. When the first solution is coated on the at least one circuit board 2, the third macromolecule waterproof coating 43 which has the stronger viscosity is coated on the tips, corners and other thinner portions of the components 201 of the at least one circuit board 2, and then the second macromolecule waterproof coating 42, the first macromolecule waterproof coating 41 and the second solution are coated to the third macromolecule waterproof coating 43 in sequence.

Specifically, a content of the polyurethane resin in the third macromolecule waterproof coating 43 is ranged from about 84.0 wt % to about 94.0 wt %. A particle size of each of the plurality of the silicon dioxide nanoparticles is ranged from 0.1 nm to 10 nm, and a content of each of the plurality of the silicon dioxide nanoparticles is ranged from about 1.0 wt % to about 2.0 wt %. It can be seen that the third macromolecule waterproof coating 43 has a composition different from the first macromolecule waterproof coating 41 that is composed of a mixture of a polyurethane resin, an alkyd resin, a diluent and titanium dioxide.

With reference to FIG. 1 to FIG. 4, the plurality of the wires 3 are used for being soldered with each battery 11, each busbar 12 and the at least one circuit board 2, so each battery pack 1 is connected with the at least one circuit board 2. Soldering positions among each wire 3, each battery 11, each busbar 12 and the at least one circuit board 2 are coated with a fourth nano coating 31. The fourth nano coating 31 is formed by coating the third macromolecule waterproof coating 43 and the first macromolecule waterproof coating 41 on the soldering positions among each wire 3, each battery 11, each busbar 12 and the at least one circuit board 2 successively. The fourth nano coating 31 has the insulation characteristic, the waterproof characteristic and the corrosion resistance characteristic. It is important to note that as described above, the first, second, third and fourth nano coatings in the present invention have different compositions and are coated on different parts and areas of the battery module.

With reference to FIG. 1 to FIG. 5, a manufacturing method of the battery module with nano-composite coating 100 applies following steps of coating and assembling the battery module with nano-composite coating 100 to coat and assemble the battery module with nano-composite coating 100. Specific steps of coating and assembling the battery module with nano-composite coating 100 are described as follows.

Step S501: coat the first macromolecule waterproof coating 41 on the outer surface of the metal barrel body 101 of each barrel-shaped battery 11.

Step S502: arrange the plurality of the batteries 11 to form the at least one battery pack 1.

Step S503: mount two busbars 12 to the two electrodes 102 of each battery 11 of each battery pack 1, at the moment, each busbar 12 is without contacting with the two electrodes 102 of each battery 11.

Step S504: solder the plurality of the wires 3 to the plurality of the batteries 11 and each busbar 12 by use of an ultrasonic soldering machine, so that the plurality of the batteries 11 of the at least one battery pack 1 are connected in series. Simultaneously, when the battery module with nano-composite coating 100 includes the plurality of the battery packs 1 and the plurality of the busbars 12, the plurality of the busbars 12 are also connected by the plurality of the wires 3, so that the plurality of the busbars 12 are connected in parallel.

Step S505: coat the second nano coating 121 to an upper portion and a lower portion of the at least one battery pack 1. In the step S505, the plurality of the busbars 12 and the electrodes 102 of the plurality of the batteries 11 connected to the plurality of the busbars 12 and exposed outside are all coated with the second nano coating 121.

When the S501 is performed, a step S601 is performed simultaneously.

Step S601: test the at least one circuit board 2. The step S601 is used to confirm whether an operation status of each component 201 of the at least one circuit board 2 is normal, if the operation status of each component 201 of the at least one circuit board 2 is normal, perform a next step S602.

Step S602: coat the third nano coating 21 to the at least one circuit board 2.

After the step S504 and the step S602 are completed being performed, proceed with the step S701. Specifically, after the step S505 and the step S602 are completed being performed, proceed with the step S701.

Step S701: connect the at least one circuit board 2 and each busbar 12 of the at least one battery pack 11 by the plurality of the wires 3. In this way, the at least one battery pack 11 and the at least one circuit board 2 are connected by the plurality of the wires 3 so that electricity of the at least one battery pack 11 is provided for the at least one circuit board 2 to make the at least one circuit board 2 use the electricity of the at least one battery pack 11.

Step S702: proceeding with a charging and discharging test. This step S702 is to test whether charging and discharging functions of the at least one battery pack 11 are normal.

Step S703: coat the fourth nano coating 31 on the soldering positions among each wire 3, each battery 11, each busbar 12 and the at least one circuit board 2 of the battery module with nano-composite coating 100.

Thus, the battery module with nano-composite coating 100 is completed being manufactured. Each of the first nano coating 111, the second nano coating 121, the third nano coating 21 and the fourth nano coating 31 is a nano-composite coating.

As described above, the battery module with nano-composite coating 100 has an insulation effect, a waterproof effect and a corrosion resistance effect by virtue of coating the nano-composite coatings to the at least one battery pack 1, the at least one circuit board 2 and the plurality of the wires 3 and the soldering positions among the at least one battery pack 1, the at least one circuit board 2 and the plurality of the wires 3.

What is claimed is:

1. A battery module with nano-composite coating, comprising:
at least one battery pack including a plurality of batteries and at least two busbars, each battery having a metal barrel body, two opposite ends of the metal barrel body of each battery being connected with two electrodes, an outer surface of the metal barrel body of each barrel-shaped battery being coated with a first nano coating, the first nano coating being composed of a first macromolecule waterproof coating, two busbars being respectively mounted to the two electrodes of each battery, and the plurality of the batteries being connected to the two busbars by a plurality of wires, so the plurality of the batteries being connected in series, each busbar and the electrodes of the plurality of the batteries connected to each busbar and exposed outside being coated with a second nano coating, the second nano coating being formed by successively coating a second macromolecule waterproof coating and the first macromolecule waterproof coating on surfaces of each busbar and the electrodes of the plurality of the batteries connected to each busbar and exposed outside; and
at least one circuit board being coated with a third nano coating, the third nano coating being formed by successively coating a first solution, the first macromolecule waterproof coating, the second macromolecule waterproof coating, a third macromolecule waterproof coating and a second solution on the at least one circuit board, the first macromolecule waterproof coating and the second macromolecule waterproof coating having different compositions, the first macromolecule waterproof coating and the third macromolecule waterproof coating having different compositions, and the first solution and the second solution having different compositions;

wherein the plurality of the wires are used for being soldered with each battery and each busbar, soldering positions among each wire, each battery and each busbar are coated with a fourth nano coating, the fourth nano coating is formed by coating the third macromolecule waterproof coating and the first macromolecule waterproof coating on the soldering positions among each wire, each battery and each busbar successively, the first macromolecule waterproof coating has a flowability larger than a flowability of the second macromolecule waterproof coating, the second macromolecule waterproof coating has a viscosity larger than a viscosity of the first macromolecule waterproof coating and the third macromolecule waterproof coating has a viscosity stronger than the viscosity of the second macromolecule waterproof coating and the first, second, third and fourth nano coatings have different compositions.

2. The battery module with nano-composite coating as claimed in claim 1, wherein the first macromolecule waterproof coating is composed of a mixture of a polyurethane (PU) resin, an alkyd resin, a diluent and titanium dioxide (TiO2).

3. The battery module with nano-composite coating as claimed in claim 2, wherein a content of the polyurethane resin in the first macromolecule waterproof coating is ranged from about 18.3 wt % to about 28.3 wt %, a content of the alkyd resin in the first macromolecule waterproof coating is ranged from about 57.2 wt % to about 67.2 wt %, a content of the diluent in the first macromolecule waterproof coating is ranged from about 9.2 wt % to about 19.2 wt %, a particle size of the titanium dioxide in the first macromolecule waterproof coating is ranged from 5 nm to 100 nm, and a content of the titanium dioxide in the first macromolecule waterproof coating is ranged from about 1.3 wt % to about 2.3 wt %.

4. The battery module with nano-composite coating as claimed in claim 1, wherein the second macromolecule waterproof coating is composed of a mixture of a polyurethane resin, a diluent and titanium dioxide (TiO2).

5. The battery module with nano-composite coating as claimed in claim 4, wherein a content of the polyurethane resin in the second macromolecule waterproof coating is ranged from about 73.5 wt % to about 83.5 wt %, a content of the diluent in the second macromolecule waterproof coating is ranged from about 14.5 wt % to about 25.5 wt %, a particle size of the titanium dioxide in the second macromolecule waterproof coating is ranged from 5 nm to 100 nm, and a content of the titanium dioxide in the second macromolecule waterproof coating is ranged from about 1.0 wt % to about 2.0 wt %.

6. The battery module with nano-composite coating as claimed in claim 1, wherein the third macromolecule waterproof coating is composed of a mixture of a polyurethane resin and a plurality of silicon dioxide nanoparticles.

7. The battery module with nano-composite coating as claimed in claim 6, wherein a content of the polyurethane resin in the third macromolecule waterproof coating is ranged from about 84.0 wt % to about 94.0 wt %, a particle size of each of the plurality of the silicon dioxide nanoparticles is ranged from 0.1 nm to 10 nm, and a content of each of the plurality of the silicon dioxide nanoparticles is ranged from about 1.0 wt % to about 2.0 wt %.

8. The battery module with nano-composite coating as claimed in claim 1, wherein the first solution includes a plurality of metal oxide nanoparticles, and a particle size of each metal oxide nanoparticle is ranged from 5 nm to 100 nm, the plurality of the metal oxide nanoparticles in the first solution are dispersed in pure water, and a content of the plurality of the metal oxide nanoparticles in the first solution is ranged from about 0.4 wt % to about 0.8 wt %.

9. The battery module with nano-composite coating as claimed in claim 8, wherein the second solution includes a plurality of silicon dioxide nanoparticles, and a particle size of each silicon dioxide nanoparticle is ranged from 0.1 nm to 10 nm, the plurality of the silicon dioxide nanoparticles in the second solution are dispersed in isopropanol of which a content in an isopropanol solution is ranged from about 98.5 wt % to about 99.5 wt %, and a content of the plurality of the silicon dioxide nanoparticles in the second solution is ranged from about 0.5 wt % to about 1.5 wt %.

10. The battery module with nano-composite coating as claimed in claim 1, wherein when the first solution is coated on the at least one circuit board, the third macromolecule waterproof coating is coated on tips, corners and other thinner portions of components of the at least one circuit board, and then the second macromolecule waterproof coating, the first macromolecule waterproof coating and the second solution are coated to the third macromolecule waterproof coating in sequence.

11. The battery module with nano-composite coating as claimed in claim 1, wherein each of the first nano coating, the second nano coating, the third nano coating and the fourth nano coating is a nano-composite coating.

12. A battery module with nano-composite coating, comprising:
a plurality of the battery packs, each battery pack including a plurality of batteries, each battery having a metal barrel body, two opposite ends of the metal barrel body of each battery being connected with two electrodes, an outer surface of the metal barrel body of each barrel-shaped battery being coated with a first nano coating, the first nano coating being composed of a first macromolecule waterproof coating;
a plurality of busbars, two busbars being respectively mounted to the two electrodes of each battery;
a plurality of wires connected among the plurality of the busbars, the plurality of the battery packs being connected in parallel, the plurality of the busbars and the electrodes of the plurality of the batteries connected to the plurality of the busbars and exposed outside being coated with a second nano coating, the second nano coating being formed by successively coating a second macromolecule waterproof coating and the first macromolecule waterproof coating on surfaces of each busbar and the electrodes of the plurality of the batteries connected to each busbar and exposed outside; and
at least one circuit board being coated with a third nano coating, the third nano coating being formed by successively coating a first solution, the first macromolecule waterproof coating, the second macromolecule waterproof coating, a third macromolecule waterproof coating and a second solution on the at least one circuit board, the first macromolecule waterproof coating and the second macromolecule waterproof coating having different compositions, the first macromolecule waterproof coating and the third macromolecule waterproof coating having different compositions, and the first solution and the second solution having different compositions;

wherein the plurality of the wires are used for being soldered with each battery and each busbar, soldering positions among each wire, each battery and each busbar are coated with a fourth nano coating, the fourth nano coating is formed by coating the third macromolecule waterproof coating and the first macromolecule waterproof coating on the soldering positions among each wire, each battery and each busbar successively, the first macromolecule waterproof coating has a flowability larger than a flowability of the second macromolecule waterproof coating, the second macromolecule waterproof coating has a viscosity larger than a viscosity of the first macromolecule waterproof coating and the third macromolecule waterproof coating has a viscosity stronger than the viscosity of the second macromolecule waterproof coating and the first, second, third and fourth nano coatings have different compositions.

13. The battery module with nano-composite coating as claimed in claim 12, wherein the first macromolecule waterproof coating is composed of a mixture of a polyurethane (PU) resin, an alkyd resin, a diluent and titanium dioxide (TiO2).

14. The battery module with nano-composite coating as claimed in claim 13, wherein a content of the polyurethane resin in the first macromolecule waterproof coating is ranged from about 18.3 wt % to about 28.3 wt %, a content of the alkyd resin in the first macromolecule waterproof coating is ranged from about 57.2 wt % to about 67.2 wt %, a content of the diluent in the first macromolecule waterproof coating is ranged from about 9.2 wt % to about 19.2 wt %, a particle size of the titanium dioxide in the first macromolecule waterproof coating is ranged from 5 nm to 100 nm, and a content of the titanium dioxide in the first macromolecule waterproof coating is ranged from about 1.3 wt % to about 2.3 wt %.

15. The battery module with nano-composite coating as claimed in claim 12, wherein the second macromolecule waterproof coating is composed of a mixture of a polyurethane resin, a diluent and titanium dioxide (TiO2).

16. The battery module with nano-composite coating as claimed in claim 15, wherein a content of the polyurethane resin in the second macromolecule waterproof coating is ranged from about 73.5 wt % to about 83.5 wt %, a content of the diluent in the second macromolecule waterproof coating is ranged from about 14.5 wt % to about 25.5 wt %, a particle size of the titanium dioxide in the second macromolecule waterproof coating is ranged from 5 nm to 100 nm, and a content of the titanium dioxide in the second macromolecule waterproof coating is ranged from about 1.0 wt % to about 2.0 wt %.

17. A battery module with nano-composite coating, comprising:

a plurality of the battery packs, each battery pack including a plurality of batteries, each battery having a metal barrel body, two opposite ends of the metal barrel body of each battery being connected with two electrodes, an outer surface of the metal barrel body of each barrel-shaped battery being coated with a first nano coating composed of a first macromolecule waterproof coating;

a plurality of busbars mounted to the electrodes of the plurality of the batteries;

a plurality of wires connected among the plurality of the busbars, the plurality of the battery packs being connected in parallel, the plurality of the busbars and the electrodes of the plurality of the batteries connected to the plurality of the busbars and exposed outside being coated with a second nano coating, the second nano coating being formed by successively coating a second macromolecule waterproof coating and the first macromolecule waterproof coating on surfaces of each busbar and the electrodes of the plurality of the batteries connected to each busbar and exposed outside; and at least one circuit board being coated with a third nano coating, the third nano coating being formed by successively coating a first solution, the first macromolecule waterproof coating, the second macromolecule waterproof coating, a third macromolecule waterproof coating and a second solution on the at least one circuit board, the plurality of the wires being soldered with each battery and7 each busbar, soldering positions among each wire, each battery and each busbar being coated with a fourth nano coating which is formed by coating the third macromolecule waterproof coating and the first macromolecule waterproof coating on the soldering positions among each wire, each battery and each busbar successively, the first macromolecule waterproof coating and the second macromolecule waterproof coating having different compositions, the first macromolecule waterproof coating and the third macromolecule waterproof coating having different compositions, and the first solution and the second solution having different compositions;

wherein the first macromolecule waterproof coating has a flowability larger than a flowability of the second macromolecule waterproof coating, the second macromolecule waterproof coating has a viscosity larger than a viscosity of the first macromolecule waterproof coating, the third macromolecule waterproof coating has a viscosity stronger than the viscosity of the second macromolecule waterproof coating, the third macromolecule waterproof coating is coated on tips, corners or other thinner portions of components of the at least one circuit board by a point-coating way, and the first, second, third and fourth nano coatings have different compositions.

18. The battery module with nano-composite coating as claimed in claim 17, wherein the first macromolecule waterproof coating is composed of a mixture of a polyurethane (PU) resin, an alkyd resin, a diluent and titanium dioxide (TiO2), a content of the polyurethane resin in the first macromolecule waterproof coating is ranged from about 18.3 wt % to about 28.3 wt %, a content of the alkyd resin in the first macromolecule waterproof coating is ranged from about 57.2 wt % to about 67.2 wt %, a content of the diluent in the first macromolecule waterproof coating is ranged from about 9.2 wt % to about 19.2 wt %, a particle size of the titanium dioxide in the first macromolecule waterproof coating is ranged from 5 nm to 100 nm, and a content of the titanium dioxide in the first macromolecule waterproof coating is ranged from about 1.3 wt % to about 2.3 wt %;

wherein the second macromolecule waterproof coating is composed of a mixture of a polyurethane resin, a diluent and titanium dioxide (TiO2), a content of the polyurethane resin in the second macromolecule waterproof coating is ranged from about 73.5 wt % to about 83.5 wt %, a content of the diluent in the second macromolecule waterproof coating is ranged from about 14.5 wt % to about 25.5 wt %, a particle size of the titanium dioxide in the second macromolecule waterproof coating is ranged from 5 nm to 100 nm, and a content of the titanium dioxide in the second macromolecule waterproof coating is ranged from about 1.0 wt % to about 2.0 wt %,
- wherein the third macromolecule waterproof coating is composed of a mixture of a polyurethane resin and a plurality of silicon dioxide nanoparticles, a content of the polyurethane resin in the third macromolecule waterproof coating is ranged from about 84.0 wt % to about 94.0 wt %, a particle size of each of the plurality of the silicon dioxide nanoparticles is ranged from 0.1 nm to 10 nm, and a content of each of the plurality of the silicon dioxide nanoparticles is ranged from about 1.0 wt % to about 2.0 wt %,
- wherein the first solution includes a plurality of metal oxide nanoparticles, and a particle size of each metal oxide nanoparticle is ranged from 5 nm to 100 nm, the plurality of the metal oxide nanoparticles in the first solution are dispersed in pure water, and a content of the plurality of the metal oxide nanoparticles in the first solution is ranged from about 0.4 wt % to about 0.8 wt %, and
- wherein the second solution includes a plurality of silicon dioxide nanoparticles, and a particle size of each silicon dioxide nanoparticle is ranged from 0.1 nm to 10 nm, the plurality of the silicon dioxide nanoparticles in the second solution are dispersed in isopropanol of which a content in an isopropanol solution is ranged from about 98.5 wt % to about 99.5 wt %, and a content of the plurality of the silicon dioxide nanoparticles in the second solution is ranged from about 0.5 wt % to about 1.5 wt %.

19. The battery module with nano-composite coating as claimed in claim 1, wherein the first macromolecule waterproof coating is composed of a mixture of a polyurethane (PU) resin, an alkyd resin, a diluent and titanium dioxide (TiO2), a content of the polyurethane resin in the first macromolecule waterproof coating is ranged from about 18.3 wt % to about 28.3 wt %, a content of the alkyd resin in the first macromolecule waterproof coating is ranged from about 57.2 wt % to about 67.2 wt %, a content of the diluent in the first macromolecule waterproof coating is ranged from about 9.2 wt % to about 19.2 wt %, a particle size of the titanium dioxide in the first macromolecule waterproof coating is ranged from 5 nm to 100 nm, and a content of the titanium dioxide in the first macromolecule waterproof coating is ranged from about 1.3 wt % to about 2.3 wt %;
- wherein the second macromolecule waterproof coating is composed of a mixture of a polyurethane resin, a diluent and titanium dioxide (TiO2), a content of the polyurethane resin in the second macromolecule waterproof coating is ranged from about 73.5 wt % to about 83.5 wt %, a content of the diluent in the second macromolecule waterproof coating is ranged from about 14.5 wt % to about 25.5 wt %, a particle size of the titanium dioxide in the second macromolecule waterproof coating is ranged from 5 nm to 100 nm, and a content of the titanium dioxide in the second macromolecule waterproof coating is ranged from about 1.0 wt % to about 2.0 wt %,
- wherein the third macromolecule waterproof coating is composed of a mixture of a polyurethane resin and a plurality of silicon dioxide nanoparticles, a content of the polyurethane resin in the third macromolecule waterproof coating is ranged from about 84.0 wt % to about 94.0 wt %, a particle size of each of the plurality of the silicon dioxide nanoparticles is ranged from 0.1 nm to 10 nm, and a content of each of the plurality of the silicon dioxide nanoparticles is ranged from about 1.0 wt % to about 2.0 wt %,
- wherein the first solution includes a plurality of metal oxide nanoparticles, and a particle size of each metal oxide nanoparticle is ranged from 5 nm to 100 nm, the plurality of the metal oxide nanoparticles in the first solution are dispersed in pure water, and a content of the plurality of the metal oxide nanoparticles in the first solution is ranged from about 0.4 wt % to about 0.8 wt %, and
- wherein the second solution includes a plurality of silicon dioxide nanoparticles, and a particle size of each silicon dioxide nanoparticle is ranged from 0.1 nm to 10 nm, the plurality of the silicon dioxide nanoparticles in the second solution are dispersed in isopropanol of which a content in an isopropanol solution is ranged from about 98.5 wt % to about 99.5 wt %, and a content of the plurality of the silicon dioxide nanoparticles in the second solution is ranged from about 0.5 wt % to about 1.5 wt %.

20. The battery module with nano-composite coating as claimed in claim 12, wherein the first macromolecule waterproof coating is composed of a mixture of a polyurethane (PU) resin, an alkyd resin, a diluent and titanium dioxide (TiO2), a content of the polyurethane resin in the first macromolecule waterproof coating is ranged from about 18.3 wt % to about 28.3 wt %, a content of the alkyd resin in the first macromolecule waterproof coating is ranged from about 57.2 wt % to about 67.2 wt %, a content of the diluent in the first macromolecule waterproof coating is ranged from about 9.2 wt % to about 19.2 wt %, a particle size of the titanium dioxide in the first macromolecule waterproof coating is ranged from 5 nm to 100 nm, and a content of the titanium dioxide in the first macromolecule waterproof coating is ranged from about 1.3 wt % to about 2.3 wt %;
- wherein the second macromolecule waterproof coating is composed of a mixture of a polyurethane resin, a diluent and titanium dioxide (TiO2), a content of the polyurethane resin in the second macromolecule waterproof coating is ranged from about 73.5 wt % to about 83.5 wt %, a content of the diluent in the second macromolecule waterproof coating is ranged from about 14.5 wt % to about 25.5 wt %, a particle size of the titanium dioxide in the second macromolecule waterproof coating is ranged from 5 nm to 100 nm, and a content of the titanium dioxide in the second macromolecule waterproof coating is ranged from about 1.0 wt % to about 2.0 wt %,
- wherein the third macromolecule waterproof coating is composed of a mixture of a polyurethane resin and a plurality of silicon dioxide nanoparticles, a content of the polyurethane resin in the third macromolecule waterproof coating is ranged from about 84.0 wt % to about 94.0 wt %, a particle size of each of the plurality of the silicon dioxide nanoparticles is ranged from 0.1 nm to 10 nm, and a content of each of the plurality of the silicon dioxide nanoparticles is ranged from about 1.0 wt % to about 2.0 wt %,
- wherein the first solution includes a plurality of metal oxide nanoparticles, and a particle size of each metal oxide nanoparticle is ranged from 5 nm to 100 nm, the plurality of the metal oxide nanoparticles in the first solution are dispersed in pure water, and a content of the plurality of the metal oxide nanoparticles in the first solution is ranged from about 0.4 wt % to about 0.8 wt %, and wherein the second solution includes a plurality of silicon dioxide nanoparticles, and a particle size of each silicon dioxide nanoparticle is ranged from 0.1 nm to 10 nm, the plurality of the silicon dioxide nanoparticles in the second solution are dispersed in isopropanol of which a content in an isopropanol solution is ranged from about 98.5 wt % to about 99.5 wt %, and a content of the plurality of the silicon dioxide nanoparticles in the second solution is ranged from about 0.5 wt % to about 1.5 wt %.

\* \* \* \* \*